United States Patent Office 3,347,676
Patented Oct. 17, 1967

3,347,676
PHOTOPOLYMERIZABLE COMPOSITIONS AND PROCESS
Harry N. Cripps, Hockessin, Del., assignor to E. I. du Pont de Nemours and Company, Wilmington, Del., a corporation of Delaware
No Drawing. Filed Apr. 30, 1964, Ser. No. 364,006
13 Claims. (Cl. 96—115)

This invention relates to new photopolymerizable compositions and to a process for polymerizing them.

Photopolymerization, i.e., polymerization brought about by light, is a well-known process that is important in fields such as graphic arts and information storage. In nearly all known photopolymerization systems, the process is a free-radical one, i.e., the actual initiation of the polymerization is by free radicals produced by the action of the light. Such systems have the disadvantages that (a) monomers that do not polymerize by free-radical initiation cannot be used and (b) the polymerization is subject to inhibition by molecular oxygen.

Cationically initiated polymerization, or, as it is usually termed, cationic polymerization, together with the compounds that undergo it, is well known in the art. See, for example, Flory, "Principles of Polymer Chemistry," pages 217 ff. (Cornell, 1953); D'Alelio, "Fundamental Principles of Polymerization," pages 314 ff. (Wiley, 1952); and Billmeyer, "Textbook of Polymer Chemistry," pages 263 ff. (Interscience, 1957). Compounds conventionally used as initiators for this type of polymerization are Lewis acids, i.e., compounds that can accept a pair of electrons. Well-known examples are aluminum chloride, boron trifluoride, stannic chloride, titanium tetrachloride, hydrogen fluoride, and sulfuric acid.

It has now been found that combinations of certain metal salts and certain halide compounds, both defined below, the latter of which act as promoters, are effective as photoinitiators for cationic polymerization, i.e., they initiate cationic polymerization in the presence of light. Therefore the present invention involves a novel composition comprising as essential ingredients a metal salt, a halide promoter, and a substance capable of cationic polymerization. The invention is also directed to the use of the initiator system comprising the metal salt/halide promoter combination in the photopolymerization of the cationically polymerizable substance by exposure to actinic light of wave lengths between 2500 A. and 7000 A. In a preferred embodiment, the process is used to prepare a relief image.

THE METAL SALT

The metal salts that are active as compounds of the initiator system are ones which are appreciably soluble (i.e., at least about 0.01%) in the photopolymerization mixture, which form an acid that is an initiator of cationic polymerization, and whose halide salt is sparingly soluble (i.e., less than about 0.001%) in the photopolymerization mixture.

Metal salts that satisfy these requirements include (a) silver(I) and thallium(I) salts of highly fluorinated alkanesulfonic acids, in particular perfluoroalkanesulfonic acids or β-hydroperfluoroalkanesulfonic acids, and (b) silver(I) and cerium(III) salts of substituted decahydrodecaboric acids [i.e., salts of dihydrogen substituted decahydrodecaborates(2-)] or of substituted dodecahydrododecarboric acids [i.e., salts of dihydrogen substituted dodecahydrododecahydrates(2-)].

(a) *Salts of highly fluorinated alkanesulfonic acids*

The fluorinated alkanesulfonic acid salts can be represented by the formula (1) $\qquad RSO_3M$ where M is silver(I) or thallium(I) and R is a perfluoroalkyl or β-hydroperfluoroalkyl radical. Because of availability, a preferred class is that in which R contains at most about 7 carbons. Because of ease of preparation from low-cost starting materials, salts in which R is β-hydroperfluoroalkyl are preferred, especially those in which R is of at most about 7 carbons. The most easily prepared compounds of this type are salts of the formula (2) 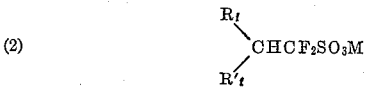

where $R_f$ and $R'_f$ are the same or different and are fluorine or perfluoroalkyl, and preferably together contain at most about 5 carbons, and the other terms are as defined above. These compounds therefore constitute an especially preferred class of metal salts. Most preferably at least one of $R_f$ and $R'_f$ is fluorine.

Silver is a preferred value of M because of its high activity.

Examples of operable fluorinated alkanesulfonic acid salts are the following: $CF_3SO_3Ag$, $CF_2HCF_2SO_3Tl$, $C_2F_5SO_3Ag$, $(CF_3)_2CHCF_2SO_3Ag$, n-$C_3F_7SO_3Ag$ i-$C_3F_7SO_3Tl$, n-$C_4F_9SO_3Tl$, $(CF_3)_2CF(CF_2)_4SO_3Ag$ n-$C_3F_7CFHCF_2SO_3Ag$, n-$C_4F_9CFHCF_2SO_3Tl$ n-$C_3F_7CH(CF_3)CF_2SO_3Ag$, n-$C_8F_{17}SO_3Ag$ n-$C_{11}F_{23}SO_3Tl$, n-$C_5F_{11}CFHCF_2SO_3Ag$ and n-$C_7F_{15}CFHCF_2SO_3Tl$ (b) *Salts of polyboron acids*

The substituted decahydrodecaborate and substituted dodecadodecahydroborate salts, hereinafter referred to as polyboron salts, that can function as part of the initiator system can be represented by the formula (3) $\qquad M'_2(B_nH_{n-p-q}X_pY_q)_{m'}$ where M' is silver(I) or cerium(III);
X is halogen;
Y is hydroxyl, hydrocarbyloxyalkoxy in which any unsaturation is aromatic, i.e., free of aliphatic unsaturation, or hydrocarbylcarbonyl in which any unsaturation is aromatic;
n is 10 or 12;
p is a cardinal number of 1–12, inclusive, being equal to n minus q when q is greater than zero;
q is 0, 1, or 2;
p+q is at most equal to n; and
m' is the valence of M'

When p is greater than 1, the halogens represented by X can be the same or different.

Subgenerically, these salts can be represented as being selected from the following class of compounds:

(4) $M'_2(B_{12}H_{12-p-q}X_pY_q)_{m'}$ and
(5) $M'_2(B_{10}H_{10-p-q}X_pY_q)_{m'}$ where M', X, Y, $n$, $p$, $q$, and $m'$ are defined as above.

When $n=p+q$, the formulas become:

(6) $M'_2(B_{12}X_pY_q)_{m'}$ and
(7) $M'_2(B_{10}X_pY_q)_{m'}$ where M', X, Y, $p$, $q$, and $m'$ are as defined above.

In addition, when $q=0$ the formulas become:

(8) $M'_2(B_{12}H_{12-p}X_p)_{m'}$ and
(9) $M'_2(B_{10}H_{10-p}X_p)_{m'}$

When $n=p$, Formulas 6 and 7 become:

(10) $M'_2(B_{12}X_{12})_{m'}$ and
(11) $M'_2(B_{10}X_{10})_{m'}$

For reasons of availability, preferred hydrocarbyloxyalkoxy groups represented by Y in Formulas 3–7 are those containing 2–12 carbons. Examples are 2-ethoxyethoxy, 2 - (1 - naphthyloxy)ethoxy, 2-butoxyethoxy, 3-phenoxypropoxy, 4-methoxybutoxy, 10-methoxydecyloxy, and 6-hexyloxyhexyloxy. A more preferred group is that in which any hydrocarbon moieties are lower saturated aliphatic, i.e., loweralkoxy-loweralkoxy, especially those in which the Y group contains a total of at most 6 carbons. Aliphatic is defined as unsubstituted aliphatic.

For the same reason, preferred hydrocarbylcarbonyl groups represented by Y are those of 2–12 carbon atoms. Examples are acetyl, isobutyryl, cyclohexylcarbonyl, pentamethylbenzoyl, 2-naphthoyl, cyclopropylacetyl, dodecanoyl, and 7-methyloctanoyl. Hydrocarbylcarbonyl groups of 2–7 carbons are especially preferred.

X in Formulas 3–11 can be any halogen, i.e., fluorine, chlorine, bromine, or iodine.

Because of their ease of preparation and the ease of carrying out the process when they are used, polyboron salts of Formula 3 in which $p=n$, $q$ is zero (i.e., Formulas 10 and 11) and all the halogens represented by X are the same are especially preferred. Salts in which X is chlorine are especially preferred because of their superior solubility in many liquid monomers that are polymerized in the process of the invention. Silver salts (compounds of Formula 3 in which M' is silver) are preferred for reasons of availability.

Examples of polyboron-salt initiators that can be used in the products and process of the invention are:

$Ag_2B_{10}F_{10}$, $Ag_2B_{10}H_6Cl_4$, $Ce_2(B_{10}H_4F_6)_3$, $Ag_2B_{12}H_{10}F_2$ $Ce_2(B_{12}F_{12})_3$, $Ag_2B_{12}H_2Cl_{10}$, $Ag_2B_{10}Br_{10}$, $Ag_2B_{10}H_2Cl_8$ $Ce_2(B_{12}H_6Br_6)_3$, $Ag_2B_{10}H_3Br_7$, $Ce_2(B_{12}Br_8F_4)_3$ $Ag_2B_{10}HBr_9$, $Ag_2B_{12}F_3Br_3I_6$, $Ag_2B_{12}F_4Cl_3Br_2I_3$ $Ce_2[B_{12}I_{10}(OCH_2CH_2OCH_3)_2]_3$, $Ag_2B_{10}H_7I_3$ $Ce_2(B_{10}H_4I_6)_3$, $Ag_2B_{12}Cl_{11}COC_6H_5$ $Ce_2[B_{10}Cl_8(COCH_3)_2]_3$, $Ag_2B_{10}Br_8(COC_7H_{15})_2$ $Ce_2(B_{10}Cl_9OCH_2CH_2OCH_3)_3$, $Ag_2B_{10}Br_9COC_6H_5$ $Ag_2B_{10}Cl_9OH$, $Ce_2[B_{10}Cl_8(OH)_2]_3$, $Ag_2B_{12}Br_{11}OH$ $Ag_2B_{12}F_{12}$, $Ag_2B_{10}Cl_8(OH)_2$, $Ag_2B_{10}I_{10}$, $Ag_2B_{12}I_{12}$ $Ce_2(B_{12}Cl_{12})_3$, $Ag_2B_{12}F_{11}OH$, $Ag_2B_{12}H_{11}I$ and $Ag_2B_{10}Cl_9COC_6H_5$.

The polyboron salts just described can be used alone, i.e., without a halide promoter of the type described in the following section, as photoinitiators for cationic polymerization. Such photopolymerizable systems are the subject of assignee's copending application Ser. No. 233,162, filed Oct. 25, 1962 in the name of Walter E. Mochell, now Patent No. 3,196,098. The present invention lies in part in the finding that the halide promoters speed up significantly the photopolymerization reaction involving polyboron salts. This promoting effect makes both the products and processes involving such salts more useful, and also makes possible the use of the fluorinated alkanesulfonic acid salts as initiator components. The latter constitute the preferred type of metal-salt component in the present invention because of their generally higher solubility in the photopolymerization systems in question.

THE HALIDE PROMOTER

The halide promoters of the present invention are halogen compounds (a) in which the halogen is of atomic number of at least 17 (i.e., chlorine, bromine, or iodine), and (b) which are dissociable by actinic light of wave lengths between 2500 A. and 7000 A.

Halogen compounds that satisfy these requirements include (a) silver halides in which the halogen is of atomic number at least 17 (i.e., silver chloride, silver bromide, and silver iodide) and (b) nonpolymerizable organic aromatic halides in which at least one halogen of atomic number of at least 17 is bonded to aromatically unsaturated nuclear carbon. These organic halides can be represented by the formula

(12) $ArZ_a$ where Ar is an aromatic organic radical having a number of bonds attached to Z, Z is chlorine, bromine, or iodine and is bonded to aromatic nuclear carbon, and $a$ is the number of Z groups. When $a$ is greater than 1, the halogens represented by Z can be the same or different. Preferably they are the same, because of relative ease of preparation. Mixtures of halogen compounds can be used, including in particular commercially available mixtures of polyhalogenated aromatic hydrocarbons. Mixtures of silver halides can also be used. Chlorine is the preferred halogen because of its low cost.

The aromatic organic radical denoted by Ar can be monocyclic (e.g., derived from benzene) or polycyclic (e.g., derived from biphenyl or anthracene). When it is polycyclic, it can comprise a fused ring system such as the anthracene nucleus or a nonfused ring system such as the biphenyl nucleus.

Preferably, because of availability, Ar is a carbocyclic radical, i.e., one in which all the ring atoms are carbons. Examples of such carbocyclic ring systems are those derived from benzene, biphenyl, terphenyl, tetraphenyl, naphthalene, binaphthyl, phenanthrene, anthracene, acenaphthene, indene, and the like.

However, the term "aromatic organic radical" also includes inert, nonionic, heterocyclic ring systems that display aromatic properties, including radicals in which the heterocyclic rings form parts of polycyclic systems. Examples of such heterocyclic ring systems are thiophene, furan, and pyridine.

In addition, the term "aromatic organic radical" is defined so as to include inert substituents, i.e., substituents that do not react with strong acids at temperatures up to about 150° C. Examples of such substituents are alkyl, alkylcarbonyl, haloalkylcarbonyl, and oxo. In the alkyl portions of these substituents, lower alkyl groups are preferred, because of availability. Preferably, however, the aromatic Ar group is unsubstituted, except for the Z groups.

Because of availability, preferred types or organic halide promoters are those that contain at most 18 carbons, and particularly those that contain at most 12 carbons. Mixtures of promoters, both the silver salts and the aromatic halides, especially commercially available mixtures of aromatic halides, can be used. To avoid significant loss of promoter by volatilization during the process of the invention, it is preferred that the halide promoter have a boiling point of at least about 25° C. Chlorine is the preferred halogen in the halide promoters for economic reasons. Of the two principal classes of halide promoters, the organic promoters generally are preferred, because they are cheaper and usually more soluble in the photopolymerization system.

Examples of operable organic halide promoters are chlorobenzene,
bromobenzene,
iodobenzene,
o-dichlorobenzene,
1,2,4-trichlorobenzene, 2,5-dichlorothiophene,
1,4-dibromonaphthalene,
1-chloronapthalene,
p-diiodobenzene,
α-p-dibromoacetophenone,
2-bromothiophene,
3-iodothiophene,
2-chlorobenzothiophene,
3-iodofuran,
3-bromopyridine,
5,8-dichloroquinoline,
4-chloropropiophenone,
2,3,5,6-tetrachlorobenzoquinone,
2,3-dichloro-1,4-naphthoquinone,
4,4'-dibromobiphenyl,
polychlorinated biphenyls,
polychlorinated terphenyls,
4-iodotoluene,
3-bromotoluene,
2-chlorotoluene,
the chloroxylenes,
4-bromo-t-pentylbenzene,
7-bromoacenaphthene,
9-iodophenanthrene,
4-chloroiodobenzene,
3-bromochlorobenzene,
and 3,4-dichloroethylbenzene.

THE POLYMERIZABLE SUBSTANCE

Substances that undergo cationic polymerization include compositions containing ethylenic unsaturation (i.e., carbon-carbon double bonds) and compositions that polymerize by ring opening of cyclic groups (e.g., cyclic ethers and imines, lactones, and lactams).

Each of these chemical types in turn can be divided into two groups. The first group comprises individual chemical compounds, or "monomers," as they are frequently referred to. Customarily, in this connection, the terms "compound" and "monomer" are applied only to substances that are single chemical compounds, or, less commonly, mixtures of single chemical compounds present in known proportions. If such compounds are formed by polymerization reactions, the number of repeating units in the structure is usually relatively low, e.g., usually about four or five at most.

Most ethylenically unsaturated compounds capable of cationic polymerization, and therefore operable in the present invention, can be represented by the formula

(12)

where X and Y are the same or different; X is free of acetylinic or allenic unsaturation, and is hydrocarbyl, hydrocarbyloxy, halohydrocarbyloxy, hydroxyhydrocarbyloxy, hydrocarbylcarbonyloxyhydrocarbyloxy, or oxygen-interrupted hydrocarbyloxy containing a total of 2–4 oxygens; and Y is hydrogen or lower alkyl.

Other types of ethylenically unsaturated compounds that can undergo cationic polymerization include methyl vinyl ketone, N-vinylpyrrolidone, 1,2-dimethoxyethylene, cyclopentadiene, methylcyclopentadiene, and N-vinylcarbazole.

For reasons of availability and ease of polymerization, a preferred class of ethylenically unsaturated compounds are those of Formula 12 containing at most 13 carbons. Examples are isobutylene, 1-butene, 2-methyl-1-heptene, 1-dodecene, 1,3-butadiene, isoprene, styrene, vinylcyclohexane, 4-ethylstyrene, 4-isopropenyltoluene, vinyl methyl ether, vinyl ethyl ether, vinyl 2-chloroethyl ether, vinyl 2-ethylhexyl ether, vinyl acetoxymethyl ether, vinyl diisopropylmethyl ether, vinyl decyl ether, vinyl 2-ethoxyethyl ether, vinyl 2-(2-ethoxyethoxy)ethyl ether, vinyl 2-(methoxymethoxy)ethyl ether, vinyl methoxymethyl ether, vinyl butoxymethyl ether, vinyl 2-(butoxymethoxy)ethyl ether, vinyl 6-(methoxymethoxy)hexyl ether, isopropenyl ethyl ether, 1-ethylvinyl ether, 1-pentylvinyl methyl ether, vinyl 2-vinyloxyethyl ether, the divinyl ether of triethylene glycol, vinyl allyl ether, vinyl 4-butylcyclohexyl ether, vinyl benzyl ether, vinyl 3-phenylpropyl ether, vinyl 4-chlorobenzyl ether, vinyl 1-cyclohexylethyl ether, vinyl tetrahydrofurfuryl ether, vinyl phenyl ether, vinyl naphthyl ether, vinyl 1,2,3,4-tetrahydronaphthyl ether, vinyl decahydronaphthyl ether, and the tetravinyl ether of pentaerythritol.

A more preferred class is composed of compounds that have at most 13 carbons and are represented by Formula 12, in which X and Y are the same or different; X is alkyl, alkenyl, aryl, alkaryl, alkoxy, alkoxyalkoxy, alkoxyalkoxyalkoxy, alkenoxyalkoxy, di(alkenoxy)alkoxy, tri(alkenoxy)alkoxy, alkenoxyalkoxyalkoxy, or alkenoxyalkoxyalkoxyalkoxy; and Y is hydrogen or methyl. All the groups in the preceding sentence are defined as unsubstituted unless otherwise noted. It will be seen that the last seven values of X in the above definition come under the broad term "oxygen-interrupted hydrocarbyloxy," which is a value of X in the definition of Formula 12.

Because of availability, relative ease of polymerization, and the range of properties of the polymeric products obtainable by polymerizing systems containing them, vinyl ethers constitute a particularly preferred chemical class of monomers. Vinyl ethers are a well-known class of compounds, many of which are available commercially. They include compounds of Formula 12 in which X is hydrocarbyloxy, halohydrocarbyloxy, hydroxyhydrocarbyloxy, hydrocarbylcarbonyloxyhydrocarbyloxy, and oxygen-interrupted hydrocarbyloxy. It will be seen that, as used in this paragraph, the term "vinyl ethers" is used in a broad sense and is not restricted to such ethers containing unsubstituted vinyl ($CH_2=CH-$) groups. It includes α-(lower alkyl)vinyl ethers, e.g., isopropenyl ethers. The most preferred vinyl ethers are those containing at most 13 carbons and represented by Formula 12, in which X is alkoxy, alkoxyalkoxy, alkoxyalkoxyalkoxy, alkenoxyalkoxy, di(alkenoxy)alkoxy, tri(alkenoxy)alkoxy, alkenoxyalkoxyalkoxy, or alkenoxyalkoxyalkoxyalkoxy, and Y is hydrogen. The preceding groups are all defined as unsubstituted unless otherwise noted.

Cyclic compounds capable of cationic polymerization, and therefore operable in the present invention, are exemplified by ethylene oxide, propylene oxide, isobutylene oxide, 3,3-bischloromethyloxetane, trioxane, propiolactone, ethyleneimine, N-cyanoethyleneimine, pivalolactone, pivalothiolactone, 2,2-dimethylpropiolactam, and 1,4-dimethyl-2-oxabicyclo[2.1.1]hexan-3-one. The most readily available compounds of this type are those of relatively low carbon content, e.g., those containing at most eight carbons, and therefore cyclic monomers within this class are preferred.

This invention includes systems containing two or more compounds capable of cationic polymerization, and the copolymerization of such mixtures by exposure to actinic light. Examples are mixtures of vinyl methyl ether and vinyl 2-ethylhexyl ether; vinyl ethyl ether and the divinyl ether of diethylene glycol; vinyl isobutyl ether and isoprene; vinyl methyl ether, the divinyl ether of ethylene glycol, and butadiene; vinyl ethyl ether and isobutylene oxide; and trioxane and ethylene oxide.

The other group of substances that undergo cationic polymerization comprises polymeric materials that contain vinylidene ($CH_2=C<$) groups or cyclic ether, cyclic imine, lactone, or lactam groups and can thus be polymerized farther through addition reactions involving these groups. Customarily, in this connection, and in contradistinction to the terms "compound" and "monomer," the terms "polymeric material" and "polymer" refer to a mixture of polymeric molecules of varying molecular weight containing the same type of recurring unit. The vinylidene or cyclic groups that are involved in the cationic polymerization can recur regularly or randomly in the chain of the polymer capable of further polymerization, or they can occur but once or twice in said chain, in which case they are usually terminal groups.

Such partly polymerized materials capable of further polymerization are well known in the art, and many of them are commercially available. Examples are copolymers of allyl glycidyl ether and of vinyloxymethyl methacrylate with typical vinyl monomers, e.g., vinyl acetate and vinyl chloride; N-vinyloxymethyl derivatives of polyamides, particularly polyamides from hexamethylenediamine and adipic acid, from hexamethylenediamine and sebacic acid, and from ε-caprolactam; acetals of polyvinyl alcohol with such aldehydes as p-isopropenylbenzaldehyde, β-glycidyloxypropionaldehyde, and p-vinyloxybenzaldehyde; and the vinyl ethers of such hydroxyl polymers as cellulose, cellulose acetate containing unesterified hydroxyl groups, cellulose acetate-butyrate containing unesterified hydroxyl groups, starch, polyvinyl alcohol, and hydrolyzed ethylene/vinyl acetate copolymers. The invention includes systems containing two or more such polymerizable substances, and also mixtures of one or more such polymerizable substances with one or more polymerizable "monomers" discussed previously.

For reasons of availability, a preferred class of polymers capable of further polymerization through ethylenic unsaturation are those in which the ethylenic unsaturation is in the form of a vinyl ($CH_2=CH-$) group. For the same reason, a preferred class of polymers capable of polymerization through cyclic groups are those in which the cyclic groups are cyclic ether groups.

Preferably, the amount of metal salt in the photopolymerizable composition will be from about 0.001% to 5% by weight of total polymerizable substance or substances. However, it should be understood that even lower amounts can be used so long as they provide catalytic activity. In most compositions, the range is from 0.1% to 3.0%, and this is accordingly an especially preferred range. The weight ratio of halide promoter to metal salt can vary from about 1:10 to about 50:1. Usually the ratio is between about 3:1 and 1:5.

In addition to the metal salts, halide promoters, and polymerizable substances described in the foregoing sections, the photopolymerizable systems that are the products of this invention can contain materials such as binders, thickeners, fillers, pigments, dyes, plasticizers, extenders, inhibitors of thermal polymerization, and the like that are inert to the polymerizable substances and the initiator. The use of a soluble thickener is especially advantageous in preventing undesired flowing of the system when the process is used to prepare a relief image.

PROCESS OF THE INVENTION

Actinic light of wave lengths from about 2500 A. to about 7000 A., especially light predominating in wave lengths from 3000 A. to 5000 A., from any source, can be used in carrying out the process of the invention. When an image is being prepared on a flat surface, as in the preferred embodiment mentioned above and illustrated in subsequent examples, it is desirable to use light in the form of parallel rays.

Sources of light that are particularly useful include sunlight, mercury arcs, fluorescent light bulbs with special phosphors having maximum emission in the ultraviolet, and sunlamps of the type having both tungsten filaments and mercury arcs that emit light in essentially all wave lengths down to about 3000 A. Of these, the mercury-vapor arcs, particularly the sunlamp type, are most suitable; they are usually placed at distances of from 2 to 24 inches from the polymerization system.

The process is operable over a wide range of temperatures and pressures. The actual temperature will depend in part on the polymerizable substance or substances, the particular initiator and its concentration, and the light source. The required temperatures are generally lower for substances containing ethylenic unsaturation than for substances containing cyclic groups. Most polymerization of ethylenically unsaturated substances take place readily at from −100° C. to 50° C., temperatures between −25° C. and 25° C. being especially preferred; whereas polymerizations of cyclic substances are best carried out at 10–150° C. The pressure can vary from subatmospheric to as high as several hundred atmospheres. A preferred range is 0.5–1.5 atmospheres. Especially convenient conditions for carrying out the process are atmospheric pressure or the autogenous pressure of a closed system if one or more of the monomers boils appreciably below the operating temperature.

A solvent is not required, but an inert diluent or mutual solvent for the material to be polymerized and the initiator can be used if desired. Suitable solvents or diluents are hydrocarbons, e.g., pentane, cyclohexane, and toluene, and ethers, e.g., ethyl ether, 1,4-dioxane, and diethylene glycol dimethyl ether.

Since they can be polymerized directly in bulk in open systems and are therefore especially useful for preparing relief images by the process of the invention, cationically polymerizable substances that boil above ordinary temperatures (20–30° C.), especially those that are liquids under normal conditions, constitute a generally preferred class.

When a reactor is used, the process can be carried out in conventional chemical equipment that transmits ultraviolet radiation, or that contains a "window" for transmitting radiation. Quartz or glass can be used for this purpose, quartz being preferred because of its higher transmission. As has already been stated, and will be shown specifically in the examples, it is not necessary to exclude molecular oxygen at any stage of the process. The monomer or monomers and the initiator are preferably mixed thoroughly in the absence of actinic light, and the solution thus obtained is then exposed to actinic light. It is not necessary that a completely homogeneous system be formed; i.e., the process can be carried out in the presence of excess, undissolved initiator.

The time for polymerization varies with the material to be polymerized, the initiator, the temperature, the pressure, and the light source, among other variables. After an induction period, which may be less than one minute and is frequently no longer than a few minutes under the preferred conditions, and during which the polymerization reaction takes place to only a small extent if at all, polymerization proceeds in a fashion typical of cationic polymerizations, i.e., it often goes extremely rapidly even at low temperatures, frequently being complete in less than a minute. The course of the reaction can be followed by one or more of several methods well known to those skilled in the art, e.g., color change, viscosity increase, variation in refractive index ("schlieren" patterns), precipitation of polymer, or solidification of the reaction mixture. The polymer produced can be isolated and purified by conventional procedures.

Because it is not necessary to exclude molecular oxygen at any stage of the process, the process is especially useful for preparing relief images suitable for direct use as printing plates. The presence of atmospheric oxygen will not inhibit the process reaction.

PREPARATION OF MATERIALS

1. Metal salts

A. *Salts of highly fluorinated alkanesulfonic acids.*—β-Hydroperfluoroalkanesulfonic acids are prepared by the addition of sodium bisulfite to perfluoro-olefins in the presence of a buffer such as borax. See, for example, Koshar et al., J. Am. Chem. Soc., 75, 4595 (1953). The salts can be made from the acids by conventional methods.

The salts of perfluoroalkanesulfonic acids can be prepared from the corresponding perfluoroalkanesulfenyl chlorides, which are available by the method of Haszeldine and Kidd, J. Chem. Soc., 1953, 3219. Oxidation of the sulfenyl chlorides with chlorine and water gives the corresponding perfluoroalkanesulfonyl chlorides (Haszeldine and Kidd, J. Chem. Soc., 1955, 2901). The latter can be hydrolyzed to the sulfonic acids, and the acids neutralized to give the desired salts, by conventional procedures.

B. *Salts of polyboron acids.*—For discussion of their preparation, salts of Formula 3 can be divided arbitrarily into two groups, viz., those containing the $B_{10}$ nucleus ($n=10$) and those containing the $B_{12}$ nucleus ($n=12$). The $B_{10}$ compounds are prepared as follows:

Ammonium decahydrodecaborate, $(NH_4)_2B_{10}H_{10}$, can be prepared in quantitative yield by the reaction of a decaboryl bis(lower dialkyl sulfide), e.g., decaboryl bis (dimethyl sulfide), $B_{10}H_{12}[(CH_3)_2S]_2$, with liquid ammonia at a temperature between about $-50°$ C. and $0°$ C. The product is isolated simply by evaporating any excess, unreacted ammonia. This process is described in detail in assignee's copending application Ser. No. 6853, filed Feb. 5, 1960, in the name of Walter H. Knoth, Jr., now Patent No. 3,148,938. The decaboryl bis(lower dialkyl sulfide) is prepared by allowing decaborane, $B_{10}H_{14}$, to react with a lower dialkyl sulfide at a temperature of at least $0°$ C., and preferably at least $25°$ C., until approximately one mole of hydrogen per mole of decaborane is evolved. This process is described in detail in assignee's copending application Ser. No. 750,862, filed July 25, 1958, in the name of Earl L. Muetterties, now Patent No. 3,154,561.

Compounds containing the $(B_{10}H_{10-p-q}X_pY_q)^=$ anion (see Formula 3) are made by direct substitution reactions, in which hydrogen bonded to boron are replaced by X or Y groups. These reactions are described in detail in assignee's copending application Ser. No. 237,392, filed Nov. 13, 1962, in the name of Walter H. Knoth, Jr. Thus, halogens (X in the above formula) are introduced into the $B_{10}H_{10}^=$ anion by reaction of the appropriate halogen with $(NH_4)_2B_{10}H_{10}$ in aqueous solution. The corresponding silver or cerium salts are then prepared by conventional metathetical reactions.

For example, in the preparation of $Ag_2B_{10}Cl_{10}$, $$Na_2B_{10}H_{10}$$

is reacted with chlorine in aqueous solution at $10-25°$ C. to give a solution of $Na_2B_{10}Cl_{10}$. Addition of saturated aqueous cesium fluoride precipitates the corresponding cesium salt, $Cs_2B_{10}Cl_{10}$. Passage of an aqueous solution of the cesium salt through a column packed with an acidic cation-exchange resin gives a solution of the acid $(H_3O)_2B_{10}Cl_{10}$, which is neutralized with silver oxide. Evaporation of the resulting solution gives $Ag_2B_{10}Cl_{10}$.

Hydrocarbyloxyalkoxy groups (one value of Y in the above formula) are introduced through reaction of the appropriate methyl ether with the appropriate polyboron acid. For example, $Ag_2B_{10}Br_9OCH_2CH_2OCH_3$ is made as follows. $NaB_{10}H_{10}$ is converted to the acid $(H_3O)_2B_{10}H_{10}$ by passage through an acidic cation-exchange column. The aqueous solution of the acid obtained directly by this process is reacted with 1,2-dimethoxyethane at $70°-80°$ C. to give a solution of the substituted acid $$(H_3O)_2B_{10}H_9OCH_2CH_2OCH_3$$

The acid is neutralized with tetramethylammonium hydroxide to give the corresponding tetramethylammonium salt, which is brominated with bromine in methanol at ordinary temperature to give $$[(CH_3)_4N]_2B_{10}Br_9OCH_2CH_2OCH_3$$

The corresponding silver salt can be made by converting to the acid $(H_3O)_2B_{10}Br_9OCH_2CH_2OCH_3$, in an acidic cation-exchange column, and neutralizing with silver oxide. The hydrogens attached to the boron in the $$(B_{10}H_9OCH_2CH_2OCH_3)^=$$

anion can be replaced by other halogens directly, for example, by the method described in the preceding paragraph.

Hydrocarbylcarbonyl groups (another value of Y in the above formula) are introduced by reaction of the corresponding acyl chloride with a polyboron acid.

Hydroxyl groups (still another value of Y) can be introduced indirectly into the $B_{10}$ nucleus as follows: $Na_2B_{10}H_{10}$ is reacted with an amide such as dimethylformamide, dimethylacetamide, of N-methylpyrrolidone in the presence of hydrogen chloride. The intermediate borane-amide adduct is reacted directly with hot aqueous sodium hydroxide to give the $B_{10}H_9OH^=$ anion. If the dihydroxylated, $B_{10}H_8(OH)_2^=$, anion is desired, the borane-amide reaction mixture is heated externally for an additional period before isolating the adduct for subsequent treatment with sodium hydroxide. The hydroxylated anions can be halogenated, and the silver and cerium salts of the halogenated anions obtained, by methods already described.

Compounds containing the $B_{12}$ nucleus are prepared as follows: Any alkali-metal salt of the acid $(H_3O)_2B_{12}H_{12}$ can be prepared by the reaction of the appropriate alkalimetal hydroborate, e.g., $NaBH_4$, with diborane in the presence of an ether such as ethyl ether or 1,2-dimethoxyethane. The process is carried out in a closed system at a temperature of at least $100°$ C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a monohydrate, $$Na_2B_{12}H_{12} \cdot H_2O$$

which can absorb water from the atmosphere to form the dihydrate $Na_2B_{12}H_{12} \cdot 2H_2O$. The free acid $(H_3O)_2B_{12}H_{12}$ can be prepared by bringing an aqueous solution of any of its soluble salts into contact with an acidic cation-exchange resin. The process leads to an aqueous solution of the acid, which can be neutralized with metal hydroxides, oxides, or carbonates to give the corresponding metal salts. The latter precipitate as they are formed or can be isolated by evaporation. All these processes are described in detail in assignee's copending application Ser. No. 30,442, filed May 20, 1960, in the name of Henry C. Miller and Earl L. Muetterties, now Patent No. 3,169,045.

Compounds containing the $(B_{12}H_{12-p-q}X_pY_q)^=$ anion (see Formula 3) are made by direct substitution reactions, in which hydrogens bonded to boron are replaced by X or Y groups. These reactions are described in detail in assignee's copending application Ser. No. 246,636, filed Dec. 21, 1962, in the names of Henry C. Miller and Earl L. Muetterties. For example, $[(CH_3)_4N]_2B_{12}Cl_{12}$ is made by reacting excess chlorine with $Na_2B_{12}H_{12}$ in aqueous solution, first at $30°$ C. and then at $150°$ C., neutralizing with ammonium hydroxide and precipitating the product by addition of aqueous $(CH_3)_4NCl$.

$Cs_2B_{12}Br_{12}$ is made by reacting excess bromine with $Na_2B_{12}H_{12} \cdot 2H_2O$ in aqueous methanol at $5-15°$ C., treating the mixture with excess chlorine, removing hydrogen chloride, hydrogen bromide, and excess bromine by evaporating under reduced pressure, neutralizing with ammonium hydroxide, and precipitating the product with aqueous cesium fluoride.

Hydrocarbyloxyalkoxy, hydrocarbonyl, and hydroxyl groups can be introduced into the $B_{12}$ nucleus by the same methods used to introduce them into the $B_{10}$ nucelus (above).

All the foregoing halogenated $B_{12}$ salts are converted to the corresponding acids by passing their aqueous solutions through columns of acidic cation-exchange resins. To prepare insoluble silver salts, the aqueous solutions of the acids obtained directly from the columns are combined with a solution of a soluble silver salt, e.g., silver nitrate, whereupon the desired silver salt precipitates and is isolated by conventional methods. For soluble silver salts, the solutions of the acids are neutralized with silver oxide and evaporated to dryness to obtain the desired products. Cerium salts are prepared in the same way from the corresponding cerium compounds.

2. Halide promoters

The halide promoters either are known compounds or can be prepared by well-known literature methods. Many of them are available commercially.

3. Polymerizable substances

Like the halide promoters, nearly all the polymerizable substances involved in the products and processes of the invention are known compounds or can be prepared by well-known literature methods. In particular, vinyl ethers are readily prepared by the reaction of acetylene with the corresponding hydroxyl compounds under superatmospheric pressure in the presence of an alkali-metal hydroxide. This method is described, for example, in Copenhaver and Bigelow, "Acetylene and Carbon Monoxide Chemistry," pp. 34 ff. (Rheinhold, 1949).

1,4 - dimethyl-2-oxabicyclo[2.1.1]hexan-3-one is prepared by reacting 3-iodo-1,3-dimethylcyclobutanecarboxylic acid with one equivalent of sodium hydride in ethyl ether at a temperature below 35° C. to give the sodium salt of 3-iodo-1,3-dimethylcyclobutanecarboxylic acid, followed by pyrolysis of the salt at 80–110° C. to give the desired lactone. The preparation of 3-iodo-1,3-dimethylcyclobutanecarboxylic acid is described in U.S. 2,914,541.

EXAMPLES

The following examples illustrate the products and process of the invention.

Example 1

A mixture of 0.02 g. of $Ag_2B_{12}Cl_{12}$, 0.02 g. of α-p-dibromoacetophenone, and 4.45 g. of 2-methoxyethyl vinyl ether was agitated in a borosilicate ("Pyrex") glass reactor in the dark until a saturated solution was obtained (System A). A second solution was made up similarly in another reactor from 0.02 g. of $Ag_2B_{12}Cl_{12}$ and 4.5 g. of 2-methoxyethyl vinyl ether (no α-p-dibromoacetophenone; System B). A third solution was made up similarly in another reactor from 0.02 g. of α-p-dibromoacetophenone and 4.5 g. of 2-methoxyethyl vinyl ether (no $Ag_2B_{12}Cl_{12}$; System C).

All three reactors were placed in a water bath maintained at about 25° C. in a quartz jacket, and the systems were irradiated with a medium-intensity mercury-vapor lamp (General Electric H85–C3) at a distance of 8 inches from the reactors. Two minutes after the start of irradiation, a vigorous, exothermic reaction took place in System A, and the mixture was converted to viscous, liquid poly(2-methoxyethyl vinyl ether). Evidence of slow polymerization (significant increase in viscosity) was observed in System B only after one hour and fifty-five minutes, and exothermic polymerization occurred only after three hours and twenty minutes. No evidence of polymerization was observed in System C for 18 hours.

The experiment involving System A was repeated, except that a stream of air was bubbled through the system for 45 minutes before irradiation was begun. Exothermic polymerization took place three minutes after the start of irradiation.

The results described above show (1) that the halide promoter increases significantly the initiator activity of the metal salt, (2) that the halide promoter alone does not initiate polymerization, and (3) that the process of the invention is not inhibited by air (i.e., by oxygen).

Additional examples illustrating the process of the invention are summarized in Table I. The procedure was essentially that of Example 1, with variations as noted. In each example, a borosilicate glass reactor ("Pyrex" or "Kimax") was used, and the temperature was about 25° C.

TABLE I

| Ex. No. | Grams Monomer | Grams Metal Salt | Grams Halide Promoter |
|---|---|---|---|
| 2 | 4.45 $CH_2$=CHO$CH_2CH_2$O$CH_3$ | 0.02 $Ag_2B_{12}Cl_{12}$ | 0.1 bromobenzene. |
| 3 | 4.45 $CH_2$=CHO$CH_2CH_2$O$CH_3$ | 0.02 $Ag_2B_{12}Cl_{12}$ | 0.1 TCB.[1] |
| 4 | 4.45 $CH_2$=CHO$CH_2CH_2$O$CH_3$ | 0.02 $Ag_2B_{12}Cl_{12}$ | 0.1 2,5-dichlorothiophene. |
| 5 | 4.45 $CH_2$=CHO$CH_2CH_2$O$CH_3$ | 0.02 $Ag_2B_{12}Cl_{12}$ | 0.03 1,4-dibromonaphthalene. |
| 6 | 4.45 $CH_2$=CHO$CH_2CH_2$O$CH_3$ | 0.02 $Ag_2B_{12}Cl_{12}$ | 0.1 iodobenzene. |
| 7A | 4.45 $CH_2$=CHO$CH_2CH_2$O$CH_3$ | 0.035 $Ag_2B_{10}Cl_{10}$ | 0.035 α,p-dibromoacetophenone. |
| 7B | 4.45 $CH_2$=CHO$CH_2CH_2$O$CH_3$ | 0.035 $Ag_2B_{10}Cl_{10}$ | None. |
| 8A | 4.45 $CH_2$=CHO$CH_2CH_2$O$CH_3$ | 0.02 $Ag_2B_{12}Cl_{12}$ | 0.02 AgCl. |
| 8B | 4.45 $CH_2$=CHO$CH_2CH_2$O$CH_3$ | None | 0.02 AgCl. |
| 9A | 4.45 $CH_2$=CHO$CH_2CH_2$O$CH_3$ | 0.02 $Ag_2B_{12}Cl_{12}$ | 0.02 AgBr. |
| 9B | 4.45 $CH_2$=CHO$CH_2CH_2$O$CH_3$ | None | 0.02 AgBr. |
| 10A | 4.45 $CH_2$=CHO$CH_2CH_2$O$CH_3$ | 0.02 $Ag_2B_{10}Cl_{10}$ | 0.02 AgBr. |
| 10B | 4.45 $CH_2$=CHO$CH_2CH_2$O$CH_3$ | None | 0.02 AgBr. |
| 11 | 4.45 $CH_2$=CHO$CH_2CH_2$O$CH_3$ | 0.02 $Ag_2B_{12}Br_{12}$ | 0.02 AgBr. |
| 12 | 4.45 $CH_2$=CHO$CH_2CH_2$O$CH_3$ | 0.02 $Ag_2B_{10}Br_9OCH_2CH_2OCH_3$ | 0.02 AgBr. |
| 13 | 4.45 $CH_2$=CHO$CH_2CH_2$O$CH_3$ | 0.02 $Ag_2B_{10}Br_9OCH_2CH_2OCH_3$ | 0.02 AgCl. |
| 14A | 4.45 $CH_2$=CHO$CH_2CH_2$O$CH_3$ | 0.01 $CF_3CHFCF_2SO_3Ag$ | 0.05 PCBP.[2] |
| 14B | 4.45 $CH_2$=CHO$CH_2CH_2$O$CH_3$ | None | 0.05 PCBP.[2] |
| 15 | 4.45 $CH_2$=CHO$CH_2CH_2$O$CH_3$ | 0.0135 $CF_3CHFCF_2SO_3Tl$ | 0.05 PCBP.[2] |
| 16A | 4.45 $CH_2$=CHO$CH_2CH_2$O$CH_3$ | 0.0135 $CF_3CHFCF_2SO_3Tl$ | 0.02 TCB.[1] |
| 16B | 4.45 $CH_2$=CHO$CH_2CH_2$O$CH_3$ | 0.0135 $CF_3CHFCF_2SO_3Tl$ | None. |
| 17 | 4.45 $CH_2$=CHO$CH_2CH_2$O$CH_3$ | 0.0085 $CF_3CHFCF_2SO_3Ag$ | 0.02 TCB.[1] |
| 18 | 4.45 $CH_2$=CHO-i-$C_4H_9$ | 0.005 $CF_3CHFCF_2SO_3Ag$ | 0.005 PCBP.[2] |
| 19A | 4.45 $CH_2$=CHO-t-$C_4H_9$ | 0.005 $CF_3CHFCF_2SO_3Ag$ | 0.005 PCBP.[2] |
| 19B | 4.45 $CH_2$=CHO-t-$C_4H_9$ | 0.005 $CF_3CHFCF_2SO_3Ag$ | 0.005 PCBP.[2] |
| 19C | 4.45 $CH_2$=CHO-t-$C_4H_9$ | 0.005 $CF_3CHFCF_2SO_3Ag$ | 0.005 PCBP.[2] |
| 20 | 4.45 $CH_2$=CHO$CH_2CH_2$O$CH_3$ | 0.005 $Ag_2B_{10}Cl_{10}$ | 0.005 PCBP.[2] |
| 21 | 4.45 $CH_2$=CHO-i-$C_4H_9$ | 0.005 $Ag_2B_{10}Cl_{10}$ | 0.005 PCBP.[2] |
| 22A | 4.45 $CH_2$=CHO-t-$C_4H_9$ | 0.005 $Ag_2B_{10}Cl_{10}$ | 0.005 PCBP.[2] |
| 22B | 4.45 $CH_2$=CHO-t-$C_4H_9$ | 0.005 $Ag_2B_{10}Cl_{10}$ | 0.005 PCBP.[2] |
| 22C | 4.45 $CH_2$=CHO-t-$C_4H_9$ | 0.005 $Ag_2B_{10}Cl_{10}$ | 0.005 PCBP.[2] |

See footnotes at end of table.

TABLE I—Continued

| Ex. No. | Irradiation | | Induction Time, Hr.:Min., Before | | Remarks |
|---|---|---|---|---|---|
| | Source | Distance, in. | Start of Polymeriz. | Exothermic Polymeriz. | |
| 2 | G.E. H85-C3 | 8 | 0:10 | 0:35 | |
| 3 | G.E. H85-C3 | 8 | 0:10 | 0:16 | |
| 4 | G.E. H85-C3 | 8 | 0:10 | 0:42 | |
| 5 | G.E. H85-C3 | 8 | 0:10 | 0:19 | |
| 6 | G.E. H85-D3 | 8 | 0:04 | 0:05 | |
| 7A | G.E. H85-C3 | 8 | | 0:01 | |
| 7B | G.E. H85-C3 | 8 | ca. 17:30 | | |
| 8A | G.E. H85-C3 | 6 | | 0:22 | Similar system did not polymerize during 44 days in dark. |
| 8B | G.E. H85-C3 | 6 | | | No polymerization after 4:10. |
| 9A | G.E. H85-C3 | 6 | | | Same as Example 8A. |
| 9B | | | | | No polymerization after 4:10. |
| 10A | 100-watt incandescent bulb | 6 | | 0:08 | |
| 10B | ___do___ | 6 | | | No polymerization after 3:37. |
| 11 | ___do___ | 6 | | 0:01 | |
| 12 | ___do___ | 6 | | 0:0.25 | |
| 13 | 150-watt incandescent bulb | 6 | | 0:34 | |
| 14A | G.E. H85-A3/UV | 8 | 0:00 | 0:07 | |
| 14B | G.E. H85-A3/UV | 8 | | | No polymerization after 24:44. |
| 15 | G.E. H85-A3/UV | 8 | 0:15 | 0:26 | |
| 16A | G.E. H85-A3/UV | 8 | 0:12 | 0:20 | |
| 16B | | | | | No polymerization after 1:30. |
| 17 | G.E. H85-A3/UV | 8 | 0:01 | 0:04 | |
| 18 | G.E. H85-A3/UV | 8 | 0:07 | 0:08.5 | |
| 19A | G.E. H85-A3/UV | 8 | 0:02 | | |
| 19B | G.E. H85-A3/UV | 8 | 0:06 | | 4 ml. 1,2-dimethoxyethane solvent. |
| 19C | G.E. H85-A3/UV | 8 | 0:03 | | 4 ml. cyclohexane solvent. |
| 20 | G.E. H85-A3/UV | 8 | 0:01 | 0:02.5 | |
| 21 | G.E. H85-A3/UV | 8 | 0:04 | 0:06 | |
| 22A | G.E. H85-A3/UV | 8 | 0:01.5 | 0:03 | |
| 22B | G.E. H85-A3/UV | 8 | 0:04 | | 1 ml. 1,2-dimethoxyethane solvent. |
| 22C | G.E. H85-A3/UV | 8 | 0:02 | 0:03 | 1 ml. cyclohexane solvent. |

[1] TCB is a commercial mixture of isomers of trichlorobenzene, principally 1,2,4-.
[2] PCBP is a commercial mixture of polychlorinated biphenyls containing about 42% chlorine.

*Example 23*

A solution was made up from 40 g. of diethylene glycol divinyl ether, 10 g. of polyvinyl acetate (the same as in Example 30), 0.125 g. of $Ag_2B_{12}Cl_{12}$, and 0.5 g. of bromanil (2,3,5,6-tetrabromobenzoquinone). A thin layer of the solution was spread on a glass plate and exposed to a No. 2 photoflood (incandescent) lamp at a distance of five inches. The mixture polymerized to a solid coating in 30 seconds. When a medium-intensity mercury-vapor lamp (General Electric H85–C3) was used in place of the incandescent lamp, the polymerization time was ten seconds.

When chloranil (2,3,5,6-tetrachlorobenzoquinone) was substituted for bromanil in the foregoing experiments, the times required for formation of solid polymeric coatings were 3–5 minutes and 30 seconds, respectively.

*Example 24*

The tetravinyl ether of pentaerythritol (one part by weight) and an n-butyl methacrylate/isobutyl methacrylate (1/1) copolymer (four parts by weight) were dissolved in toluene to give a solution containing 45% total solute. In this solution were dissolved $CF_3CHFCF_2SO_3Ag$ (5.5% by weight of the pentaerythritol tetravinyl ether) and an equal amount of 1,5-dichloroanthracene. A wet layer of the solution was flowed out on a 0.001″ polypropylene film, and volatile material was allowed to evaporate overnight at room temperature in the absence of actinic light. The residual film was exposed to a medium-intensity mercury-vapor lamp (General Electric H85–A3/UV) at a distance of four inches. Portions of the supported film were removed periodically and examined for the degree of infrared absorption characteristic of C=C, which corresponded inversely to the extent of polymerization of the vinyl ether. Infrared measurements indicated that the vinyl ether was about one-half polymerized after 2.25 minutes and completely polymerized (no absorption characteristic of C=C) after six minutes.

When 9,10-dibromoanthracene was substituted for 1,5-dichloroanthracene in the above experiment, the observed times were 45 seconds for approximately 50% polymerization and three minutes for complete polymerization. With 9,10-dichloroanthracene as the halide promoter, the times were 15 seconds and two minutes, respectively.

*Example 25*

1,4-dimethyl-2-oxabicyclo[2.1.1]hexan-3-one (0.25 g.)

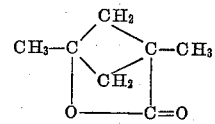

was melted at about 70° C. in a borosilicate glass ("Pyrex") reactor, and 0.002 g. of $CF_3CHFCF_2SO_3Ag$ and 0.025 g. of a commercial mixture of polychlorinated biphenyls containing about 42% combined chlorine were dissolved in the melt. The solution was irradiated with a medium-intensity mercury-vapor lamp (General Electric H85–A3/UV) at a distance of two inches. Within five minutes, the mixture had polymerized completely to give solid poly(1,4-dimethyl-2-oxabicyclo[2.1.1]hexan-3-one).

*Example 26*

Example 25 was repeated, except that 0.002 g. of $Ag_2B_{10}Br_9OCH_2CH_2OCH_3$ was substituted for the $CF_3CHFCF_2SO_3Ag$. Again, complete polymerization took place within five minutes.

*Example 27*

By the method of Example 25, a solution of 0.02 g. of $CF_3CHFCF_2SO_3Ag$ and 0.02 g. of polychlorinated biphenyl in 2 g. of N-vinylcarbazole was made up and irradiated at about 80° C., the lamp being about eight inches from the reactor. Within from two to five minutes, the mixture had polymerized essentially completely to give solid poly-(N-vinylcarbazole).

Example 28

Trioxane (2 g.) was melted in a borosilicate glass ("Pyrex") reactor at about 90° C.

$$Ag_2B_{10}Br_9CH_2CH_2OCH_3$$

(0.05 g.) was added, and the mixture was stirred at this temperature until a saturated solution was obtained. The solution was separated from undissolved silver salt by decantation, and to it was added 0.1 g. of polychlorinated biphenyl. The mixture was irradiated at about 90° C. with a medium-intensity mercury-vapor lamp (General Electric H85–C3) at a distance of five inches. Within one minute partial polymerization of the trioxane to polyoxymethylene had taken place.

Example 29

By the method of Example 28 a solution of $Ag_2B_{12}Cl_{12}$ and polychlorinated biphenyl in molten trioxane was prepared. A thin layer of the solution was spread on an aluminum plate and irradiated with the lamp of Example 28 at about 90° C. and at a distance of five inches. Within one minute a "skin" of solid polyoxymethylene began to appear on the surface of the liquid. Within three minutes, the entire layer of liquid had polymerized to solid polyoxymethylene.

Example 30

A solution of 0.71 g. of diethylene glycol divinyl ether, 2 g. of medium-viscosity polyvinyl acetate (melting range 180–200° C.), 0.05 g. of $Ag_2B_{10}Cl_{10}$, and 0.05 g. of 1,4-dibromonaphthalene in 10 ml. of tetrahydrofuran was flowed out as a wet film on a flat glass plate. Volatile material was allowed to evaporate in air at ordinary temperature in the absence of actinic light. The resulting soft film was covered with a sheet of transparent cellophane, and a lithographic negative was placed over the cellophane. The area covered by the negative was exposed for 30 minutes to a medium-intensity mercury-vapor lamp (General Electric H85–C3), after which the negative and the cellophane were removed and the film was washed thoroughly with tetrahydrofuran. This washing removed that part of the system that had not been exposed to the actinic light through the negative, and there remained, in the form of a hard polymer suitable for use as a printing plate, a relief image corresponding to that of the negative.

Example 31

A solution of 0.1 g. of $Ag_2B_{12}Cl_{12}$, 0.1 g. of 1,4-dibromonaphthalene, and 2 g. of polyvinyl acetate in 4.45 g. of diethylene glycol divinyl ether was pressed to a wet film on a glass plate. The film was processed by the method of Example 30, the exposure time being 32 minutes, to give a relief image corresponding to that of the negative.

Example 32

A thin layer of a solution of 0.025 g. of $Ag_2B_{12}Cl_{12}$, 0.05 g. of trichlorobenzene (a commercial mixture in which the 1,2,4-isomer predominated), and 1 g. of polyvinyl acetate (the same as Example 30) in 9 g. of diethylene glycol divinyl ether was poured onto a glass plate and irradiated with a medium-intensity mercury-vapor lamp (General Electric H85–A3/UV) at a distance of five inches. Within 30 seconds, a "skin" of solid poly(diethylene glycol divinyl ether) had appeared on the top of the liquid layer.

Example 33

A solution was made up containing 0.025 g. of $Ag_2B_{12}Cl_{12}$, 1.5 g. of polyvinyl acetate (the same as in Example 30), and 8.5 g. of triethylene glycol divinyl ether. The solution was divided into approximately 1-g. portions. In each portion was dissolved about 0.05 g. of halide promoter, and the resulting solution was poured into a thin layer on glass and irradiated as in Example 32. The following observations were made:

| Halide promoter: | Time before appearance of polymer "skin" |
|---|---|
| Trichlorobenzene | 1 minute. |
| α-p-Dibromoacetophenone | 15 seconds. |
| Commercial polychlorinated biphenyl (42% combined chlorine) | 20 seconds. |
| Commercial mixture of polychlorinated biphenyl and terphenyl (60% combined chlorine) | Do. |
| None | 45 minutes to one hour. |

Example 34

A thin layer of a solution of 0.01 g. of $HCF_2CF_2SO_3Ag$ and 0.2 g. of trichlorobenzene (commercial mixture, mainly 1,2,4-) in 1.8 g. of diethylene glycol divinyl ether was spread on glass and was irradiated with a medium-intensity mercury-vapor lamp (General Electric H85–A3/UV) at a distance of five inches. The mixture polymerized to a hard film in 30 seconds.

When $Ag_2B_{12}Cl_{12}$ was substituted for the $$HCF_2CF_2SO_3Ag$$

the mixture polymerized to a hard film in one minute.

In a similar experiment with 0.04 g. of $HCF_2CF_2SO_3Ag$, 0.2 g. of trichlorobenzene, and 1.8 g. of the pentaerythritol tetravinyl ether, a hard polymeric film resulted in one minute.

By essentially the procedure described above, a number of other polymerizable substances were converted to polymeric films. In each of these experiments, $$CF_2CHFCF_2SO_3Ag$$

(ca. 1% by weight of polymerizable substance) was the metal salt and a commercial polychlorinated biphenyl containing 42% chlorine (ca. 2–3% by weight of polymerizable substance) was the halide promoter. Conversion to solid, polymeric films almost always took place within 2–3 minutes after irradiation was started, and sometimes is as little as 10–15 seconds. In some of the experiments, the fact that polymerization had taken place was confirmed by the disappearance of infrared absorption characteristic of C=C bonds and/or by the increased resistance of the mixture to organic solvents. The substances that were polymerized in these experiments were the following:

1,2,6-hexanetriol trivinyl ether
2-vinyl-4-(4-vinyloxybutyl)-1,3-dioxolane
Tetraethylene glycol divinyl ether
Pentaerythritol divinyl ether
1-allyloxymethyl-1,1-di(vinyloxymethyl)propane
Isopropenyl butyl ether
Poly(2-vinyloxyethyl methacrylate)
2-vinyloxyethyl methacrylate/methyl methacrylate (1/4) copolymer
2-vinyloxyethyl methacrylate/butyl methacrylate (1/4) copolymer
Vinyl ether of styrene/allyl alcohol (1/1) copolymer
Glycidyl methacrylate/butyl methacrylate (1/10) copolymer
1,4-cyclohexanedimethanol divinyl ether
Divinyl ether of 1,4-cyclohexanedimethanol/ethylene oxide (1/1) condensation product
1,3-cyclobutanediol divinyl ether

Example 35

The source of the halide promoter was a polyethylene terephthalate film coated with a gelatin/silver chloride/silver bromide emulsion (AgCl/AgBr mole ratio=70/30), which emulsion was prepared as described in the first sentence of Example I of assignee's copending application Ser. No. 94,989, filed Mar. 13, 1961 in the name of Robert W. Nottorf, now Patent No. 3,142,568. The metal salt $CF_3CHFCF_2SO_3Ag$ was incorporated with the promoter by soaking the emulsion-coated film in an aqueous 5% solution of the salt at about 35–40° C. for one minute, followed by drying for one minute in warm (40–50° C.) air. Pentaerythritol tetravinyl ether and 2-hydroxyethyl vinyl ether were incorporated with the initiating system by soaking the coating for about five minutes with a 1/1 solution of the vinyl ethers and wiping off excess liquid. A lettertext phototransparency was placed on top of the coating, and the system was irradiated for about four minutes by a 500-watt photoflood lamp at a distance of 12 inches. After washing with soapy water to remove the unexposed part of the system, there remained a pentaerythritol tetravinyl ether/2-hydroxyethyl vinyl ether copolymer in the form of a relief image corresponding to the phototransparency.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A photopolymerizable composition comprising
(A) a metal salt selected from the group consisting of
  (1) fluorinated alkanesulfonic acid salts of the formula $RSO_3M$ wherein M is a cation of the group consisting of silver(I) and thallium(I) and R is a group selected from the class consisting of perfluoroalkyl of at most 7 carbon atoms and β-hydroperfluoroalkyl of at most 7 carbon atoms;
  (2) a metal salt of a polyboron acid of the formula $M'_2(B_nH_{n-p-q}X_pY_q)_{m'}$ wherein
    M' is a cation selected from the class consisting of silver(I) and cerium(III);
    X is halogen;
    Y is of up to 12 carbon atoms and is selected from the class consisting of hydroxyl, hydrocarbyloxyalkoxy free of aliphatic unsaturation, and hydrocarbylcarbonyl free of aliphatic unsaturation;
    n is a number selected from the group consisting of 10 and 12;
    p is a cardinal number of 1 to 12, inclusive, being equal to n minus q when q is greater than zero;
    q is a cardinal number of 0 to 2, inclusive;
    p+q being at most equal to n; and
    m' is the valence of M';
(B) a halide promoter which is dissociable by actinic light of wave lengths between about 2500 A. and 7000 A. and which is selected from the class consisting of
  (1) silver halides in which the halogen is of atomic number of at least 17, and
  (2) a nonpolymerizable organic aromatic halide of the formula $ArZ_a$ wherein Z is a halogen of atomic number of at least 17, a is the number of Z groups, and Ar is an aromatic organic group of up to 18 carbon atoms; and
(C) at least one substance capable of cationic polymerization.

2. The photopolymerizable composition of claim 1 wherein the weight ratio of the halide promoter to the metal salt is between 1:10 and 50:1, and wherein the amount of metal salt present in the composition is from about 0.001 to 5.0 percent of the total composition.

3. The composition of claim 1 wherein the metal salt has the formula $RSO_3Ag$ in which R is β-hydroperfluoroalkyl of at most 7 carbon atoms; and wherein the halide promoter is of the formula $ArZ_a$ wherein Z and a are defined as in claim 2 and wherein Ar is a carbocyclic aromatic group of up to 18 carbon atoms which can be substituted with a group of the class consisting of lower alkyl, lower alkylcarbonyl, halo-lower-alkylcarbonyl and oxo.

4. The photopolymerizable composition of claim 1 wherein the substance capable of cationic polymerization is selected from the class of compounds consisting of
ethylenically unsaturated compounds containing at most 13 carbons and having the formula

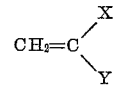

wherein Y is selected from the class consisting of hydrogen and lower alkyl and X is a group free of acetylenic and allenic unsaturation selected from the class consisting of hydrocarbyl, hydrocarbyloxy, hydroxyhydrocarbyloxy, halohydrocarbyloxy, hydrocarbylcarbonyloxyhydrocarbyloxy, and oxygen-interrupted hydrocarbyloxy containing 2–4 oxygen atoms; and
compositions that polymerize by ring opening of cyclic groups.

5. The photopolymerizable composition of claim 4 wherein the substance capable of polymerization is a vinyl ether.

6. The photopolymerizable composition of claim 4 wherein the metal salt is $CF_3CHFCF_2SO_3Ag$, and the halide promoter is α-p-dibromoacetophenone.

7. The photopolymerizable composition of claim 4 wherein the metal salt is $CF_2H—CF_2—SO_3Ag$, and the halide promoter is trichlorobenzene.

8. The photopolymerizable composition of claim 4 wherein the metal salt is $CF_3—CFH—CF_2—SO_3Ag$, and the halide promoter is at least one polychlorinated biphenyl.

9. The photopolymerizable composition of claim 4 wherein the metal salt is $Ag_2B_{12}Cl_{12}$, and the halide promoter is trichlorobenzene.

10. The photopolymerizable composition of claim 4 wherein the metal salt it $Ag_2B_{10}Cl_{10}$, and the halide promoter is at least one polychlorinated biphenyl.

11. The photopolymerizable composition of claim 4 wherein the metal salt is $CF_3CHFCF_2SO_3Ag$, and the halide promoter is a mixture of AgCl and AgBr.

12. A photopolymerization process which comprises exposing to light of wave lengths from about 2500 A. to 7000 A. a composition defined as in claim 2.

13. The process of claim 12 carried out at a temperature of between about −100° and 150° C.

References Cited

UNITED STATES PATENTS 3,196,098  7/1965  Mochel _____ 204—159.24

J. TRAVIS BROWN, *Acting Primary Examiner.*

NORMAN G. TORCHIN, *Examiner.*

R. H. SMITH, *Assistant Examiner.*